Dec. 9, 1952     V. C. FUSCO ET AL     2,621,207
METHOD OF MAKING ISOPROPYL-2,4,5-TRICHLOROPHENOXYACETATE
Filed Jan. 27, 1951
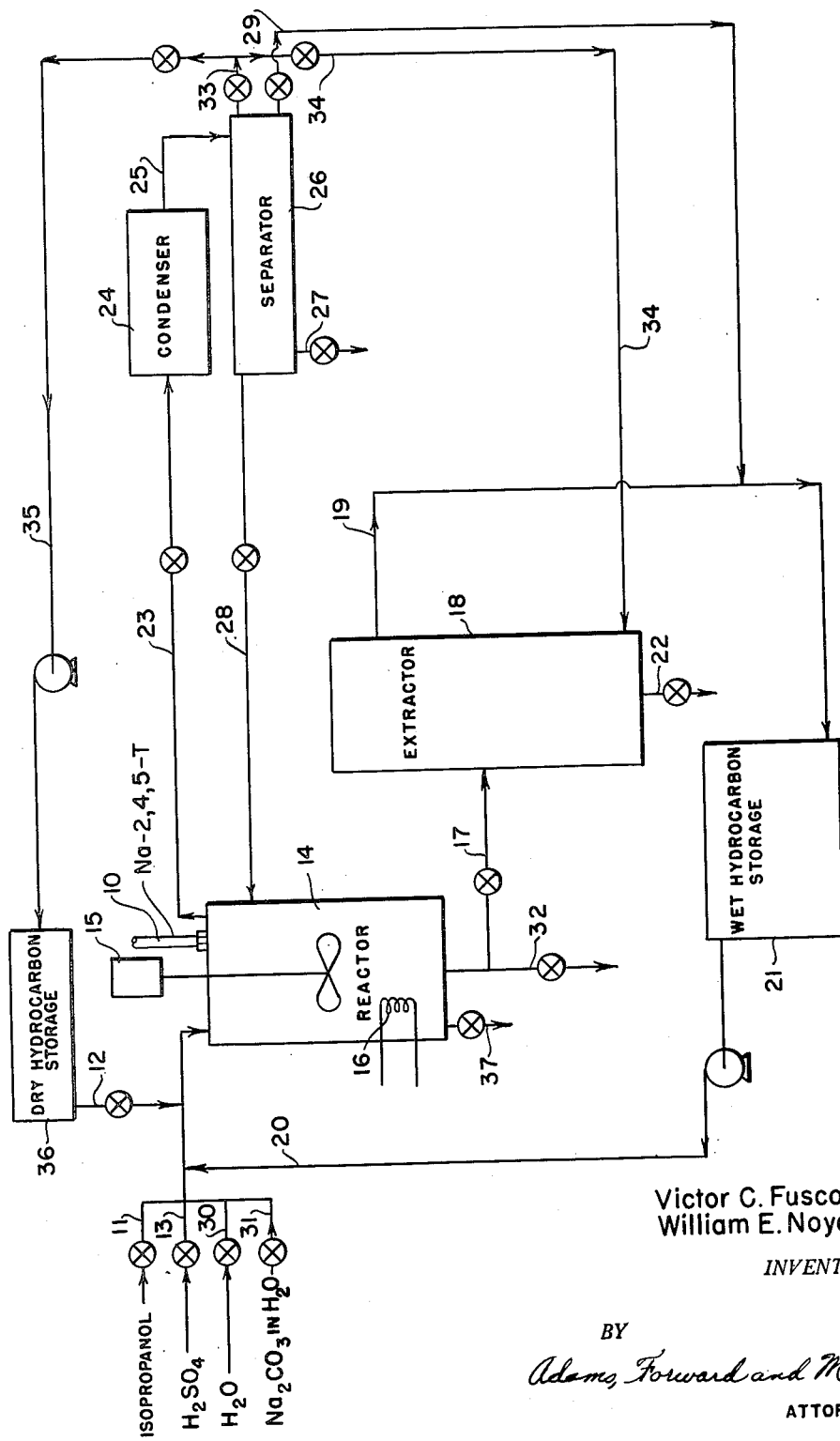
Victor C. Fusco
William E. Noyes
*INVENTORS*
BY
*Adams, Forward and McLean*
ATTORNEYS Patented Dec. 9, 1952

2,621,207

UNITED STATES PATENT OFFICE 2,621,207

METHOD OF MAKING ISOPROPYL-2,4,5-TRICHLOROPHENOXYACETATE

Victor C. Fusco, Fort Niagara, Youngstown, and William E. Noyes, Niagara Falls, N. Y., assignors to Mathieson Chemical Corporation, a corporation of Virginia Application January 27, 1951, Serial No. 208,172

4 Claims. (Cl. 260—473)

This invention relates to an improved process for the manufacture of isopropyl 2,4,5-trichlorophenoxyacetate from the sodium salt of 2,4,5-trichlorophenoxyacetic acid.

Isopropyl 2,4,5-trichlorophenoxyacetate is ordinarily prepared by production and isolation of the free halophenoxyacetic acid followed by conventional esterification with isopropyl alcohol in the presence of a mineral acid. The free halophenoxyacetic acid is conventionally produced by condensing the halophenol dissolved in aqueous caustic alkali with a solution of sodium chloroacetate, the initial product of the condensation being the sodium salt of the halophenoxyacetic acid. Acidification of the resulting solution liberates the phenoxyacid and it may be precipitated from aqueous media in this way and separated. It is, however, always contaminated with unreacted phenol and the separation of these two materials is difficult.

To avoid the difficulty of separation of the unreacted phenol and the phenoxyacid, therefore, it has been found advantageous to crystallize sodium 2,4,5 - trichlorophenoxyacetate directly from the aqueous alkaline reaction mixture with or without the addition of sodium chloride to decrease the solubility of the sodium salt in water. Under these conditions excess phenolate remains dissolved and may be washed out with water. The resulting sodium 2,4,5-trichlorophenoxyacetate filter cake is dried, acidified, and purified in the usual manner to obtain the free halophenoxyacetic acid necessary as a reactant in the ordinary preparation of the isopropyl ester.

We have now found that isopropyl 2,4,5-trichlorophenoxyacetate can be directly produced from the sodium salt in the wet filter cake form in which it is obtained from the condensation reaction mixture, thus avoiding the necessity of prior precipitation and separation of the free acid and at the same time providing important economies in the esterification process, particularly with respect to alcohol requirements and handling of materials.

According to our invention, the wet filter cake containing approximately equal parts by weight of water and sodium 2,4,5-trichlorophenoxyacetate is directly converted into high quality isopropyl 2,4,5-trichlorophenoxyacetate containing over 99% ester and not over 0.1% of free acid by a series of operations involving a hydrocarbon solvent which may be carried out in a single reaction vessel. Throughout this application when we refer to the hydrocarbon solvent as being wet, we mean that it contains some dissolved alcohol, and when we refer to it as being dry, we mean that it contains substantially no dissolved alcohol. The improved process consists essentially of a multi-step operation in the first step of which the sodium 2,4,5-trichlorophenoxyacetate in the form of wet filter cake is admixed with a hydrocarbon solvent, isopropyl alcohol, and sufficient sulfuric acid to liberate the free organic acid, the aqueous layer being withdrawn after it separates and its alcohol content extracted and recycled. The 2,4,5-trichlorophenoxyacetic acid and alcohol in hydrocarbon solution are then esterified at reflux temperature in the presence of additional sulfuric acid with continuous removal of the water formed by the reaction, the wet hydrocarbon solvent being distilled over at the termination of the esterification. The residual ester is then purified by adding dry hydrocarbon solvent, water, and sufficient soda ash to neutralize the sulfuric acid remaining in the ester, withdrawing the aqueous layer after it separates, and steam distilling the hydrocarbon solution of ester to remove the hydrocarbon solvent which is recycled, the pure isopropyl 2,4,5-trichlorophenoxyacetate remaining as the residue.

It is a significant advantage of our invention that the wet filter cake of sodium 2,4,5-trichlorophenoxyacetate as it is obtained from the condensation reaction mixture may be conveniently charged to the reaction vessel without prior drying, acidification and purification. Since the wet filter cake as charged to the reaction vessel contains about 50% by weight of water, a substantial reduction in heat requirements is effected by dispensing with the necessity of evaporating the moisture from the filter cake charge prior to its conversion to the halophenoxyacetic acid. There are corresponding economies in capital outlay for equipment and in handling materials in the liquid form.

A further advantage is that the excess alcohol necessary to effect the esterification is reduced from about 30 moles of alcohol per mole of 2,4,5-trichlorophenoxyacetic acid, the amount conventionally required to obtain a 95% yield of ester, to about 3 to 5 moles of alcohol per mole of 2,4,5-trichlorophenoxyacetic acid to obtain the same yield, and also that the excess alcohol employed to effect the esterification is recovered in suitable condition for re-use without involving fractional distillation. These advantages appear to be attributable primarily to the hydrocarbon solvent employed in our process. In the acidification step, the hydrocarbon solvent apparently serves to keep most of the alcohol out of the water layer by selective extraction and in admixture with the 2,4,5-trichlorophenoxyacetic acid, which the hydrocarbon also takes up while rejecting the sodium sulphate and water by their virtual insolubility, thereby reducing greatly the excess alcohol required for complete esterification and effectively separating the water from the filter cake. The costly additional step of drying the filter cake is thus eliminated. During the esterification the hydrocarbon solvent seems to facilitate greatly the removal in the overhead of the water formed by the esterification as a tertiary mixture of solvent, alcohol and water and to augment the recovery and recycle of alcohol. During the purification the hydrocarbon solvent appears to take up the isopropyl ester thereby apparently preventing its reversible reaction with water, and to reject the sodium sulphate and water by their virtual insolubility.

In the practice of our invention we have found that it is advantageous to use as the hydrocarbon solvent a substantially saturated aliphatic petroleum hydrocarbon fraction approximating heptane in composition. This material is preferably in the boiling range of heptanes and preferably contains a considerable proportion thereof. However, it may contain appreciable amounts of hexanes or even pentanes as well as octanes. Preferably the hydrocarbon solvent has a boiling range of about 84° to about 100° C. and is free of higher boiling ends and lighter fractions. Products having a lower boiling range and consisting largely of hexanes or pentanes are much less desirable in our process due probably to the losses by evaporation and the slower esterification reaction at the lower boiling temperature of the bulk of the hydrocarbon solvent.

Distinctly less satisfactory results were obtained using aromatic solvents for the azeotropic distillation in the esterification reaction. Aromatic and olefinic materials tend to react with the sulfuric acid used as the catalyst thereby reducing the efficiency of the hydrocarbon solvent. For this and additional unknown reasons, we prefer to use hydrocarbon fractions consisting substantially of paraffinic hydrocarbons, and essentially free from materials reactive with sulfuric acid. Suitable petroleum fractions may be washed with sulfuric acid until all reactive components have been removed. Furthermore, benzene and toluene display decreased ability to remove overhead the water formed by the esterification reaction, resulting in a longer time necessary to complete the reaction. Using benzene to remove the water in the esterification step, the mixture was refluxed for a total of 4 hours at which time about 84% of the water had been removed from the mixture. In contrast, using only 3.0 moles of saturated aliphatic petroleum hydrocarbon solvent approximating heptane in composition and a refluxing time of 3.5 hours, about 97% of the water was removed from the reaction mixture.

Although we have found that hydrochloric acid speeds up the esterification reaction when used as the catalyst, we prefer to use sulfuric acid since it is less corrosive and is more easily handled besides being less expensive. Moreover in the acidification (first step) the sulfuric acid does not carry over into the organic layer as hydrochloric acid does.

An illustrative process flow plan is diagrammatically indicated in the accompanying drawing. The wet filter cake containing approximately equal parts by weight of water and of sodium 2,4,5-trichlorophenoxyacetate is charged to the reaction vessel 14 through feed pipe 10. Concurrently therewith about 3 moles of isopropyl alcohol are passed through valved line 11, about 3 moles (calculated as heptane) of a substantially saturated aliphatic petroleum hydrocarbon fraction approaching heptane in composition both per mole of sodium salt are passed through valved line 12, and about 0.55 mole of sulfuric acid on the same basis are passed through valved line 13 into the reaction vessel. The contents of the reaction vessel are agitated vigorously by means of mechanical agitator 15 and heated to a temperature of about 70–75° C. by means of heating coil 16. As soon as the solid is completely dissolved the agitation is discontinued and the contents of the reaction flask allowed to stratify. The aqueous layer is withdrawn from the reaction vessel 14 through valved line 17. It contains sodium sulfate from the neutralization, any excess sulfuric acid, and a small amount of isopropanol. It is advantageous to pass this aqueous layer to an extractor such as extractor 18 where the isopropanol may be removed with recovered petroleum hydrocarbon, the hydrocarbon solution of isopropanol so obtained being withdrawn through line 19 and returned to the reaction vessel 14 from storage vessel 21 through line 20 where it may be used again with another batch of filter cake. The aqueous layer from which the isopropanol has been extracted is withdrawn from the extractor through valved line 22 and discarded. The 2,4,5-trichlorophenoxyacetic acid and isopropanol remaining in the reaction vessel in hydrocarbon solution are esterified by adding about 1% of sulfuric acid through line 13 to catalyze the esterification and heating to refluxing temperature by means of heating coil 16. Additional dry solvent may be added through line 12. The distilled vapor is passed through valved line 23 to condenser 24 and from there the distillate is passed through line 25 to separator 26. The distillate is continuously separated to remove water containing alcohol which is returned through valved lines 29 and 19 to wet hydrocarbon storage 21 and the hydrocarbon which is returned to the reaction vessel through valved line 28. When no further quantities of water separate from the distillate, line 28 is closed and the hydrocarbon distilled over without returning it to the reaction vessel, the distillate containing hydrocarbon and isopropanol being passed through valved lines 29 and 19 to storage vessel 21 for return to the reaction vessel through line 29 for use again with another batch of filter cake.

For each mole of residual ester in the reaction vessel is added about 1 mole of dry hydrocarbon solvent through line 12, 11 moles of water through valved line 30, and sufficient soda ash solution through valved line 31 to neutralize the sulfuric acid remaining in the ester. Sodium bicarbonate may be substituted for sodium carbonate in this neutralization. The mixture is agitated by means of mechanical agitator 15 and then stratified at about 50° C. which temperature is maintained by heating coil 16. The aqueous layer containing sodium sulfate is removed through valved line 32 and discarded. The hydrocarbon solution of ester remaining in the reaction vessel is distilled to remove the hydrocarbon, finally steaming the ester at 125° C. to remove the last of the hydrocarbon. The hydrocarbon solvent and water vapor pass through line 23 to condenser 24 and then through line 25 to separator 26. The water is withdrawn and discarded by means of valved line 27, and the dry hydrocarbon recovered at this point is passed in part through valved lines 33 and 34 to extractor 18 to extract the isopropanol from the aqueous layer withdrawn from the reaction vessel in the first step and in part through lines 33 and 35 to storage vessel 36 for reuse in the neutralization step. Pure isopropyl 2,4,5-trichlorophenoxyacetate remains in the reaction vessel as a residue and is withdrawn therefrom to storage through valved line 37.

We claim:

1. In the production of isopropyl 2,4,5-trichlorophenoxyacetate from the sodium salt of the corresponding halophenoxyacetic acid, the improvement which comprises acidifying the wet salt of the halophenoxyacetic acid with sufficient inorganic acid to liberate the free organic acid in the presence of a hydrocarbon solvent and isopropyl alcohol, withdrawing the resulting water phase, esterifying the resulting hydrocarbon phase at reflux temperature in the presence of a catalytic amount of an inorganic acid esterification catalyst, continuously removing by distillation the water formed by the esterification, distilling over the wet hydrocarbon solvent at the termination of the esterification, adding dry hydrocarbon solvent, water, and sufficient base to neutralize the inorganic acid remaining in the ester, withdrawing the resulting water phase, and steam distilling the hydrocarbon solution of ester to remove the hydrocarbon solvent and leave the isopropyl 2,4,5-trichlorophenoxyacetate remaining as a distillation residue, said hydrocarbon solvent consisting essentially of a substantially saturated aliphatic petroleum hydrocarbon fraction having a boiling range within that of pentanes through octanes.

2. The process for producing isopropyl 2,4,5-trichlorophenoxyacetate which comprises admixing the sodium salt of 2,4,5-trichlorophenoxyacetic acid in the form of wet filter cake with a hydrocarbon solvent, isopropyl alcohol and sufficient inorganic acid to liberate the free organic acid, and withdrawing the aqueous layer after it separates; esterifying the halophenoxyacetic acid and alcohol in hydrocarbon solution at reflux temperature in the presence of a catalytic amount of an inorganic acid esterification catalyst, continuously removing by distillation the water formed by the reaction, distilling over the wet hydrocarbon solvent at the termination of the esterification; and purifying the residual ester by adding dry hydrocarbon solvent, water, and sufficient soda ash to neutralize the inorganic acid remaining in the ester, withdrawing the aqueous layer after it separates, and steam distilling the hydrocarbon solution of ester to remove the hydrocarbon solvent and leave the isopropyl 2,4,5-trichlorophenoxyacetate remaining as the distillation residue, said hydrocarbon solvent consisting essentially of a substantially saturated aliphatic petroleum hydrocarbon fraction having a boiling range within that of pentanes through octanes.

3. In the production of isopropyl 2,4,5-trichlorophenoxyacetate from the sodium salt of the corresponding halophenoxyacetic acid, the improvement which comprises acidifying the wet salt of the halophenoxyacetic acid with sufficient sulfuric acid to liberate the free organic acid in the presence of a hydrocarbon solvent and isopropyl alcohol, withdrawing the resulting water phase, esterifying the resulting hydrocarbon phase at reflux temperature in the presence of a catalytic amount of sulfuric acid, continuously removing by distillation the water formed by the esterification, distilling over the wet hydrocarbon solvent at the termination of the esterification, adding dry hydrocarbon solvent, water and sufficient base to neutralize the sulfuric acid remaining in the ester, withdrawing the resulting water phase, and steam distilling the hydrocarbon solution of ester to remove the hydrocarbon solvent and leave the isopropyl 2,4,5-trichlorophenoxyacetate remaining as a distillation residue, said hydrocarbon solvent consisting essentially of a substantially saturated aliphatic petroleum hydrocarbon fraction approximating heptane in composition and boiling within the range of about 84° to about 100° C.

4. In the production of isopropyl 2,4,5-trichlorophenoxyacetate from the sodium salt of the corresponding halophenoxyacetic acid, the improvement which comprises acidifying the wet salt of the halophenoxyacetic acid with sufficient inorganic acid to liberate the free organic acid in the presence of a hydrocarbon solvent and isopropyl alcohol, withdrawing the resulting water phase, esterifying the resulting hydrocarbon phase at reflux temperature in the presence of a catalytic amount of an inorganic acid esterification catalyst, continuously removing by distillation the water formed by the esterification, distilling over the wet hydrocarbon solvent at the termination of the esterification, adding dry hydrocarbon solvent, water and sufficient base to neutralize the inorganic acid remaining in the ester, withdrawing the resulting water phase, and steam distilling the hydrocarbon solution of ester to remove the hydrocarbon solvent and leave the isopropyl 2,4,5-trichlorophenoxyacetate remaining as a distillation residue, said hydrocarbon solvent consisting essentially of a substantially saturated aliphatic petroleum hydrocarbon fraction approximating heptane in composition and boiling within the range of about 84° to about 100° C.

VICTOR C. FUSCO.
WILLIAM E. NOYES.

No references cited.